(12) United States Patent
Liu et al.

(10) Patent No.: US 12,510,487 B2
(45) Date of Patent: Dec. 30, 2025

(54) COLORIMETRIC NANOSENSOR FOR DETECTING TRACE-LEVEL OF HG2+ IN ENVIRONMENTAL WATER

(71) Applicant: Suzhou University of Science and Technology, Suzhou (CN)

(72) Inventors: Tingting Liu, Suzhou (CN); Xuedong Wang, Suzhou (CN); Huili Wang, Suzhou (CN); Ming Gao, Suzhou (CN); Binrong Li, Suzhou (CN); Chunyang Chen, Suzhou (CN); Junxia Wang, Suzhou (CN)

(73) Assignee: Suzhou University of Science and Technology, Suzhou (CN)

(*) Notice: Subject to any disclaimer, the term of this patent is extended or adjusted under 35 U.S.C. 154(b) by 0 days.

(21) Appl. No.: 18/821,344

(22) Filed: Aug. 30, 2024

(65) Prior Publication Data

US 2024/0418656 A1   Dec. 19, 2024

Related U.S. Application Data

(63) Continuation of application No. PCT/CN2024/088799, filed on Apr. 19, 2024.

(30) Foreign Application Priority Data

Apr. 21, 2023   (CN) .......................... 202310430604.9

(51) Int. Cl.
*G01N 21/78* (2006.01)
*B82Y 15/00* (2011.01)
(Continued)

(52) U.S. Cl.
CPC .............. *G01N 21/78* (2013.01); *B82Y 15/00* (2013.01); *B82Y 40/00* (2013.01); *G01N 21/94* (2013.01); *G01N 33/1813* (2013.01)

(58) Field of Classification Search
CPC ......... G01N 33/6893; G01N 2800/085; G01N 24/10; G01R 33/60
See application file for complete search history.

(56) References Cited

U.S. PATENT DOCUMENTS

| | | | |
|---|---|---|---|
| 2018/0297864 A1* | 10/2018 | Elsayed | B01J 20/3071 |
| 2023/0124515 A1* | 4/2023 | Du | G01N 33/587 |
| | | | 428/402 |

FOREIGN PATENT DOCUMENTS

| | | | | |
|---|---|---|---|---|
| CN | 107462536 A | | 12/2017 | |
| CN | 111189823 A | * | 5/2020 | ............. G01N 21/33 |

(Continued)

OTHER PUBLICATIONS

Xie Xiaolei, Applications of non-noble metal doped carbon-based nanozymes in environmental and biological analysis, Jilin University China, pp. 1-51 (Year: 2021).*

(Continued)

*Primary Examiner* — Maris R Kessel
*Assistant Examiner* — Valerie Simmons
(74) *Attorney, Agent, or Firm* — Dinsmore & Shohl LLP (57) ABSTRACT

The present disclosure provides a colorimetric nanosensor for detecting trace-levels of $Hg^{2+}$ in environmental water, which is composed of $Fe_7S_8$ nanosheets, glutathione or its aqueous solution, 3,3',5,5'-tetramethylbenzidine colorimetric solution, $H_2O_2$ aqueous solution, and NaAc-Hac buffer. The preparation method of $Fe_7S_8$ nanosheets is as follows: $FeCl_2 \cdot 4H_2O$ and $CH_4N_2S$ are dissolved in ethylene glycol in a mass ratio of (2~3):1, heated at 200° C. for 10~15 hours, cooled, centrifuged, washed, and dried to obtain. The colorimetric nanosensor of the present disclosure can quickly and sensitively determine the trace-levels $Hg^{2+}$ in environmental water. The colorimetric nanosensor of the present disclosure does not rely on large detection instruments, and the nanozymes used is low-cost, stable, and recyclable. It (Continued)

has important practical significance for accurate, fast, and low-cost detection of trace-levels of $Hg^{2+}$ in environmental water.

3 Claims, 11 Drawing Sheets

(51) Int. Cl.
  *B82Y 40/00* (2011.01)
  *G01N 21/94* (2006.01)
  *G01N 33/18* (2006.01)

(56) References Cited

FOREIGN PATENT DOCUMENTS

| | | |
|---|---|---|
| CN | 116642845 A | 8/2023 |
| WO | 2021227341 A1 | 11/2021 |

OTHER PUBLICATIONS

Jesus Cantu, Removal of Arsenic from water using synthetic Fe7S8 nanoparticles, Chem Eng J. Apr. 15, 2016; 290: 428-437, 1-31 (Year: 2017).*

Yong Liao, Recyclable Naturally Derived Magnetic Pyrrhotite for Elemental Mercury Recovery from Flue Gas, Environ. Sci. Technol. 2016, 50, 10562-10569 (Year: 2016).*

Yong Gao, Nitrogen-doped carbon nanotube encapsulated Fe7S8 nanoparticles for the high-efficiency and selective removal of Pb2+ by pseudocapacitive couplingt, Environ. Sci. Nano, 2022, 9, 2051-2060 (Year: 2022).*

Shichuan Chen, Highly Active Fe Sites in Ultrathin Pyrrhotite Fe7S8 Nanosheets Realizing Efficient Electrocatalytic Oxygen Evolution, ACS Cent. Sci. 2017, 3, 1221-1227 (Year: 2017).*

O'Brien, Nickel and Iron Sulfide Nanoparticles from Thiobiurets, dx.doi.org/10.1021/jp2078659 |J. Phys. Chem. C 2012, 116, 2253-2259, 2011 (Year: 2011).*

Xie, "Applications of non-noble metal doped carbon-based nanozymes in environmental and biological analysis" May 2021 Jilin University (Year: 2021).*

Xie et al., "Applications of non-noble metal doped carbon-based nanozymes in environmental and Biological analysis", http://www.cmfd.cnki.net/dejournals/#/cmfd/article/2022, 63 pages.

Choe et al., "Fe3S4/Fe7S8-promoted degradation of phenol via heterogeneous, catalytic H2O2 scission mediated by S-modified surface Fe2+ species", Applied Catalysts B: Environmental 233, pp. 272-280 (2018).

Cantu et al., "Removal of arsenic from water using synthetic Fe7S8 nanoparticles", Chemical Engineering Journal 290, pp. 428-437 (2016).

Song et al., "SiO2—SH and its application for preconcenration of mercury from enviromental water", Chinese Journal of Analysis Laboratory, vol. 33, No. 12, pp. 1374-1377 (2014).

Ding et al., "An enrichment-colorimetry integration strategy for nM-level Hg2+ detection in environmental waters based on an efficient Fe7S8-100 nanozyme and smartphone-based visual assay", Sensors & Actuators: B. Chemical 390, 133995, 11 pages (2023).

Ding et al., "An enrichment-colorimetry integration strategy for nM-level Hg2+ detection in environmental waters based on an efficient Fe7S8-100 nanozyme and smartphone-based visual assay", Sensors & Actuators: B., 19 pages.

* cited by examiner

COLORIMETRIC NANOSENSOR FOR DETECTING TRACE-LEVEL OF HG2+ IN ENVIRONMENTAL WATER

CROSS REFERENCE TO RELATED APPLICATIONS

This application is a continuation application of International Application serial number PCT/CN2024/088799 filed Apr. 19, 2024, which claims priority to CN2023104306049, filed Apr. 21, 2023. The disclosure of both of the applications are hereby incorporate in its entirety.

TECHNICAL FIELD

The present disclosure relates to the field of water quality detection technology, specifically to a colorimetric nanosensor for detecting trace-level of $Hg^{2+}$ in environmental water.

BACKGROUND

As a toxic heavy metal, $Hg^{2+}$ exposure can produce serious injury to human tissues and organs due to its high toxicity and bioaccumulation. The maximum residual level of $Hg^{2+}$ allowed in drinking water is less than 1.0 µg/L according to World Health Organization (WHO) and China Government standards. Thus, rapid and accurate monitoring of trace-level $Hg^{2+}$ in water is of great importance to prevent human health risks. Although approaches for $Hg^{2+}$ quantification are relatively mature, such as liquid chromatography, inductively coupled plasma mass spectrometry, electrochemical methods and so on the complex pretreatment procedures and expensive instrumentation greatly limit their on-site monitoring applications under field conditions. Thus, it is highly warranted to develop a simple, versatile, efficient and sensitive method for on-site, trace-level detection of $Hg^{2+}$ in environmental media.

In recent years, nanozymes have raised great interest owing to several distinct advantages compared to natural enzymes, such as high stability, recycling use, low cost, and convenient large-scale fabrication. These superiorities of nanozymes have contributed to their widespread application in the fields of biosensors, environmental monitoring, and point-of-care testing. Similarly, nanomaterials with enzyme-like activity have been developed for colorimetric detection of $Hg^2$. Ju and colleagues synthesized $Ag@Ag_2WO_4$ nanoparticles having strong oxidase-like activity, can be used for detection of $Hg^{2+}$ in lipstick, the detection is highly sensitive. However, the aforementioned method had a narrow linear range (0.25 µmol/L-8.0 µmol/L) and due to the need to use precious metals such as Ag and rare metals such as W to prepare nanoenzymes, the cost of nanoenzyme preparation is high, so the application prospects are limited. Lian and colleagues fabricated Pt-doped CuO/Pt and observed that the CuO/Pt exhibited stronger peroxidase-like activity compared to CuO and Pt nanoparticles alone for $Hg^{2+}$ assay in all kinds of groundwater. However, the assay required large-scale instrumentation, and due to the use of precious metal Pt, the preparation cost of nanoenzymes is relatively high, so the application prospects of this detection method are also not good.

As a sensitive sensor for biomolecules, organic pollutants, or heavy metals in complex matrices, $Fe_xS_y$ is widely used in catalytic reactions. By employing the peroxidase-like activity of nanoscale $FeS_2$, Song's team developed an effective biosensor with catalytic activity 12-fold higher than natural horseradish peroxidase (HRP). Many studies have shown that the active centers of nanozymes tend to be easily digested by environmental components after they are dispersed in the system. To improve the stability of $FeS_2$, He and colleagues engineered a nanozyme $FeS_2@SNW-1$ by coating $FeS_2$ with a COF microenvironment to achieve a highly stable and reusable nanoenzyme by virtue of the protective hydrophobic/porous SNW-1 coating on the active center of $FeS_2$. Similar to $FeS_2$, $Fe_3S_4$ also exhibits superior enzyme-like catalytic activity. Ding et al. prepared magnetic $Fe_3S_4$ nanoparticles having a higher peroxidase-like activity than other Fe-based nanomaterials. However, compared to nanoenzymes such as $Ag_2WO_4$ and CuO/Pt, the above-mentioned $Fe_xS_y$ nanoenzymes reduce the preparation cost of nanoenzymes, but their colorimetric detection effect on trace $Hg^{2+}$ in environmental water is not ideal. Analysis suggests that for colorimetric nanosensors of trace $Hg^{2+}$ in environmental water, they should have the ability to efficiently adsorb/enrich trace $Hg^{2+}$ and utilize their superior catalytic activity towards chromogenic substrates for sensitive colorimetric detection. However, the aforementioned $Fe_xS_y$ nanoenzyme and its detection system have some shortcomings in both aspects. Therefore, the development of new colorimetric nanosensors for trace $Hg^{2+}$ is of great practical significance for accurate, rapid, and low-cost detection of trace-level $Hg^{2+}$ in environmental water.

SUMMARY

The purpose of the present disclosure is to provide a colorimetric nanosensor for detecting trace-level of $Hg^{2+}$ in environmental water.

To solve the above technical problems, the present disclosure adopts the following technical solution:

A colorimetric nanosensor for detecting trace $Hg^{2+}$ in environmental water, which is composed of $Fe_7S_8$ nanosheets, glutathione or its aqueous solution, 3,3',5,5'-tetramethylbenzidine colorimetric solution, $H_2O_2$ aqueous solution, and NaAc-HAc buffer solution. The preparation method of $Fe_7S_8$ nanosheets is as follows: $FeCl_2·4H_2O$ and $CH_4N_2S$ are dissolved in ethylene glycol in a mass ratio of (2~3):1, heated at 200° C. for 10~15 hours, cooled to room temperature, and then centrifuged, washed, and dried to obtain the solid product, which is $Fe_7S_8$ nanosheets.

Further, the content of $Fe_7S_8$ nanosheets in the colorimetric nanosensor is 3~7 µg/mL.

Further, the content of glutathione in the colorimetric nanosensor is 0.025~0.2 µmol/mL.

Further, the 3,3',5,5'-tetramethylbenzidine colorimetric solution is a 3,3', 5,5'-tetramethylbenzidine DMSO solution.

Further, the content of 3,3',5,5'-tetramethylbenzidine in the colorimetric nanosensor is 0.5~0.7 µmol/mL.

Further, the content of $H_2O_2$ in the colorimetric nanosensor is 0.8~3 µmol/mL.

Further, the pH value of the NaAc-HAc buffer is 3~5.

The present disclosure also provides the application of the above-mentioned colorimetric nanosensor in environmental water analysis.

The present disclosure also provides a method for detecting trace-level of $Hg^{2+}$ in environmental water using the aforementioned colorimetric nanosensor, including the following steps:

(1) Prepare pre-treatment water samples with different spiking concentrations using the water sample to be tested and $Hg^{2+}$ standard solution;

(2) Mix and shake the pre-treatment water sample in step (1) with $Fe_7S_8$ nanosheets, and then separate $Fe_7S_8$ nanosheets enriched with $Hg^{2+}$ under the action of a magnet;

(3) Mix $Fe_7S_8$ nanosheets enriched with $Hg^{2+}$ with glutathione or its aqueous solution, 3,3',5,5'-tetramethylbenzidine colorimetric solution, $H_2O_2$ aqueous solution, and NaAc-HAc buffer to obtain a colorimetric system. Incubate in a water bath at 35~45° C. for 15~30 min;

(4) Remove $Fe_7S_8$ from the colorimetric system after reaction in step (3) through a 0.22 μm mixed cellulose filter membrane, terminate the reaction, visually observe the color change of the colorimetric system after reaction in step (3), or measure the absorbance value of the filtrate at 652 nm using a UV spectrophotometer, or take photos of the filtrate and calculate the grayscale value.

Further, the water sample to be tested in step (1) is 15~25 mL.

Further, the range of labeling levels for step (1) is 0.1~10 μmol/L.

Further, in step (2), the amount of $Fe_7S_8$ nanosheets used is 4~8 mg.

Further, in step (2), adjust the pH value of the mixture of the pretreated water sample and the $Fe_7S_8$ nanosheets to 3.5~4.5.

Further, in step (2), the mixed oscillation is carried out at room temperature, and the time of the mixed oscillation is 15~30 min;

Further, in step (3), the $Fe_7S_8$ nanosheets enriched with $Hg^{2+}$ are mixed with the NaAc-HAc buffer to prepare a $Fe_7S_8$ suspension with a concentration of 50~150 μg/mL for feeding.

Further, in step (3), the concentration of $Fe_7S_8$ nanosheets enriched with $Hg^{2+}$ in the colorimetric system is 3~7 μg/mL.

Further, in step (3), the concentration of glutathione in the colorimetric system is 0.025~0.2 μmol/L.

Further, in step (3), the 3,3',5,5'-tetramethylbenzidine colorimetric solution is a 3,3',5,5'-tetramethylbenzidine DMSO solution with a concentration of 4~10 mmol/L.

Further, in step (3), the concentration of 3,3',5,5'-tetramethylbenzidine in the colorimetric system is 0.5~0.7 μmol/L.

Further, in step (3), the concentration of $H_2O_2$ in the colorimetric system is 0.8~3 μmol/L.

Further, in step (3) and step (4), the $Hg^{2+}$ content in the water sample to be tested is detected based on a smartphone detection platform. The filtrate is photographed using a smartphone and uploaded to the "Thing Identity" software, which can calculate the grayscale value of the captured photo and calculate the $Hg^{2+}$ content in the water sample based on the grayscale value.

A portable and highly sensitive $Hg^{2+}$ colorimetric sensor has been developed using $Fe_7S_8$ as an efficient enrichment carrier, specific recognition unit and colorimetric catalyst. The adsorption efficiency of $Fe_7S_8$ nanosheets for $Hg^{2+}$ is over 90%. The multi-valence states of Fe in the $Fe_7S_8$ nanosheets confer its excellent enzyme-like catalytic activity, resulting in the oxidation of colorless 3,3',5,5'-tetramethylbenzidine (TMB) to blue oxTMB. And glutathione (GSH) can inhibit the above reaction to generate blue. $Hg^{2+}$ and the —SH group of GSH will form an $Hg^{2+}$-SH complex, causing the inhibitory effect of glutathione to disappear, ultimately restoring the blue color. That is, the $Fe_7S_8$+TMB+GSH system is colorless, but if both $Hg^{2+}$ are present, the formation of the $Hg^{2+}$—SH complex will make the system turn blue. The linear range of the "enrichment-colorimetric" integrated platform constructed based on this is 0.01-300 μmol/L, with a detection limit of 3 nmol/L. The $Fe_7S_8$ nanosheets of the present disclosure have low preparation cost and good stability, can be recycled, simplifies $Hg^{2+}$ detection operation and shortens detection time, significantly reduces $Hg^{2+}$ detection cost, and has good application prospects.

The present disclosure also integrates a portable high sensitivity $Hg^{2+}$ colorimetric sensor with "Thing Identity" software to develop a smartphone based $Hg^{2+}$ colorimetric detection APP, with a detection limit of 30 nmol/L and a recovery rate of 86-115%. In order to obtain high-resolution imaging photos, a smartphone based visual photography device was designed and manufactured, which has the advantages of reducing the interference of natural light on imaging and making blue images clearer. Overall, the integrated strategy of "no desorption-enrichment-colorimetry", combined with smartphone based visual detection, provides a feasible solution to meet the practical needs of on-site/real-time monitoring of trace $Hg^{2+}$ in environmental water.

The present disclosure has the following advantages compared to prior art:

The colorimetric nanosensor of the present disclosure can quickly and sensitively determine the nM-level $Hg^{2+}$ in environmental water. The colorimetric nanosensor of the present disclosure does not rely on large detection instruments, and the nano enzyme used is low-cost, stable, and recyclable. It has important practical significance for accurate, fast, and low-cost detection of nM-level $Hg^{2+}$ in environmental water.

BRIEF DESCRIPTION OF THE DRAWINGS

FIGS. 1A-1H shows the characterization results of the nanosheets prepared in Example 1.

(FIG. 8A, FIG. 8B, FIG. 8C, FIG. 8D, FIG. 8E, FIG. 8F, FIG. 8G, FIG. 8H).

DETAILED DESCRIPTION

The following will further describe the present disclosure in conjunction with embodiments. But the present disclosure is not limited to the following embodiments. The implementation conditions used in the implementation examples can be further adjusted according to the different requirements of specific use, and the unspecified implementation conditions are common conditions in the industry. The technical features involved in various embodiments of the present disclosure can be combined with each other as long as they do not conflict with each other. The implementation conditions used in the implementation examples can be further adjusted according to specific requirements, and the unspecified implementation conditions are usually those in conventional experiments.

All chemical reagents used in the current work were of analytical or chromatographic grade. We purchased the following chemicals from Adams (Shanghai, China): acetic acid ($CH_3COOH$, 98.5%), sodium acetate ($CH_3COONa$, 99.0%), hydrogen peroxide ($H_2O_2$, 30%), 3,3,5,5-tetramethylbenzidine (TMB), dimethyl sulfoxide (DMSO, 99.0%), ferrous chloride ($FeCl_2 \cdot 4H_2O$, 98.5%), thiourea ($CH_4N_2S$, 99.0%), ethylene glycol (EG, 99.0%), ethanol absolute (99.0%). The standard $Hg^{2+}$ (1000 μg/mL) solution was obtained from Tansoole (Shanghai, China). Glutathione (GSH, 98.0%) was obtained from Bioss (Beijing, China). All chemical were utilized without further purification, and a Milli-Q system (Bedford, MA, USA) was used to produce ultrapure water (greater than 18.2 MΩ) for experimental use.

They included field emission scanning electron microscopy (SEM, Quanta250; FEI, USA), transmission electron microscopy (Talos F200X G2; FEI, USA), X-ray diffractometer (D8-Advance, Bruker, Germany), X-ray photoelectron spectroscopy (K-Alpha+type; Thermo Scientific, USA). Enzyme kinetics data and UV-vis spectra were acquired on a UV-8000 spectrophotometer (Shanghai, China). An atomic fluorescence photometer (AFS-8; Beijing Jitian Instrument, Beijing, China) was used to measure the $Hg^{2+}$ concentration of sample solutions.

Example 1

Figure 1A:
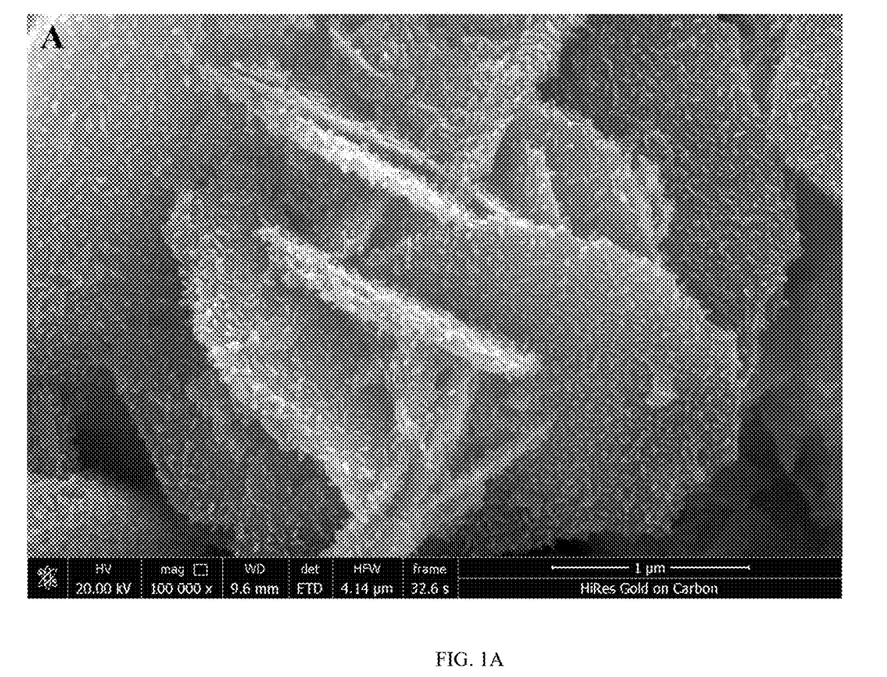
FIG. 1A depicts a SEM (Scanning Electron Microscope) image of $Fe_7S_8$, depicting morphological characteristics of the nanosheets.
Figure 1B:
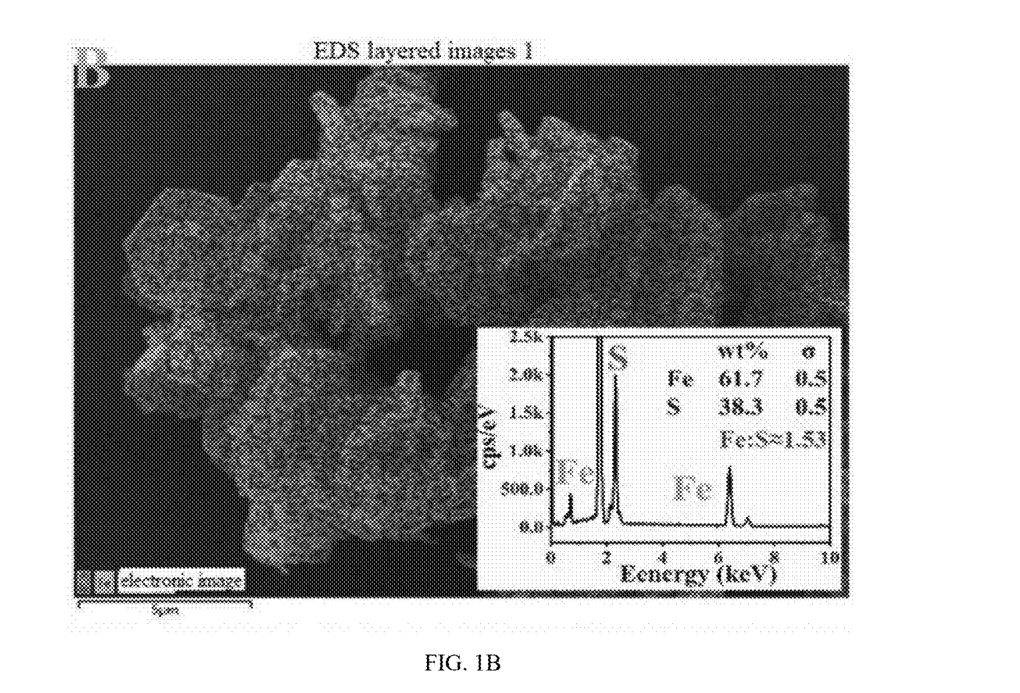
FIG. 1B depicts EDS-mapping layered images and results of FE, S element content.
Figure 1C:
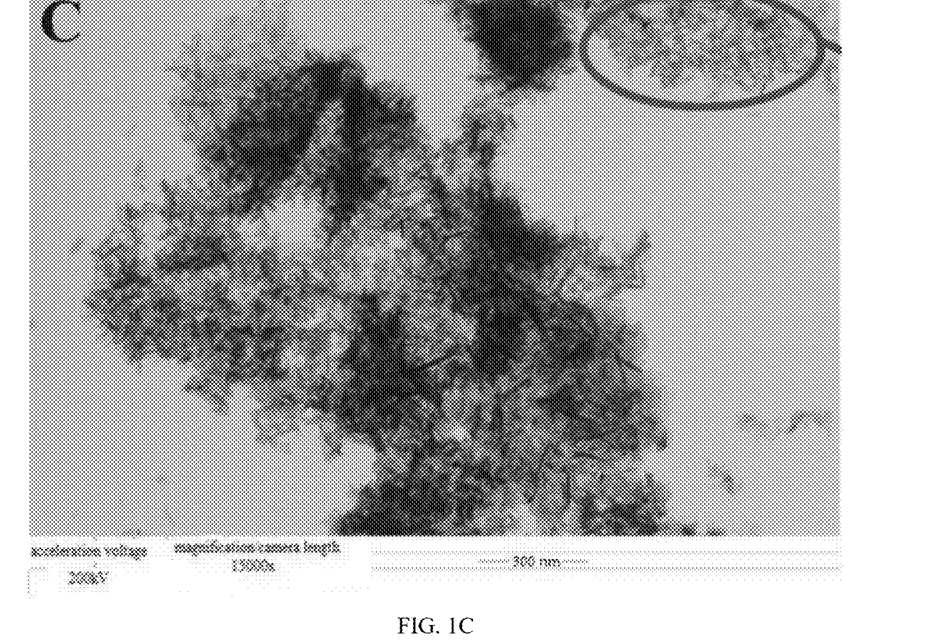
FIG. 1C depicts a TEM (Transmission Electron Microscopy) image of $Fe_7S_8$ and morphological characteristics of the nanosheets.
Figure 1D:
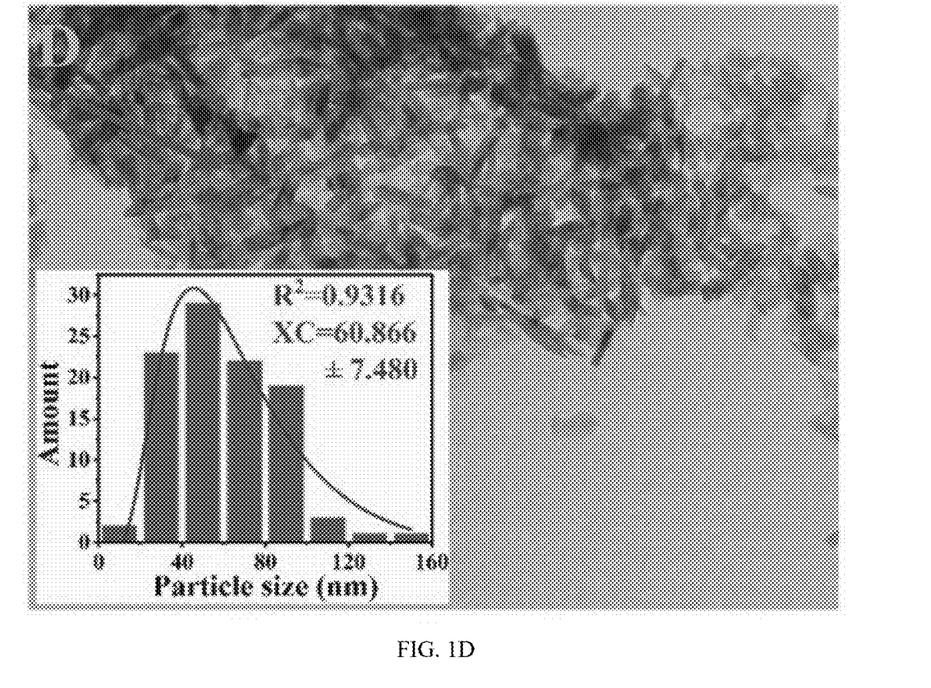
FIG. 1D depicts a partially enlarged TEM (Transmission Electron Microscopy) image of $Fe_7S_8$, depicting morphological characteristics of the nanosheets and the particle size.
Figure 1E:
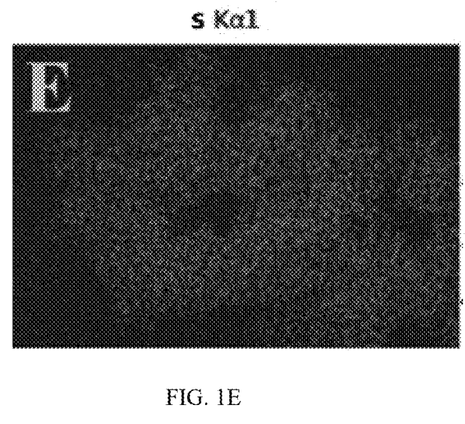
FIG. 1E and FIG. 1F depict elemental profiles of single Fe and S elements.
Figure 1F:
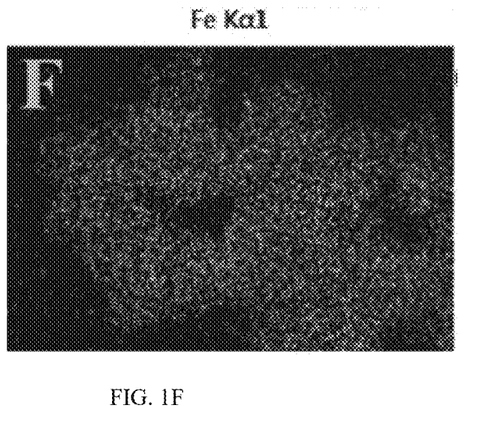
Figure 1G:
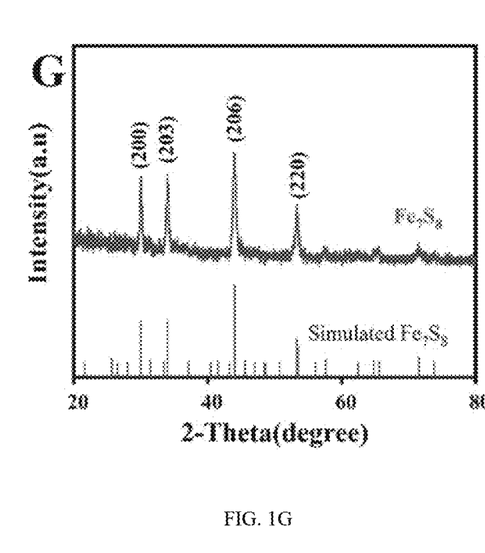
FIG. 1G depicts XRD (X-Ray Diffraction) patterns for $Fe_7S_8$, depicting the intensity of the nanosheets at varying degrees of 2-Theta.
Figure 1H:
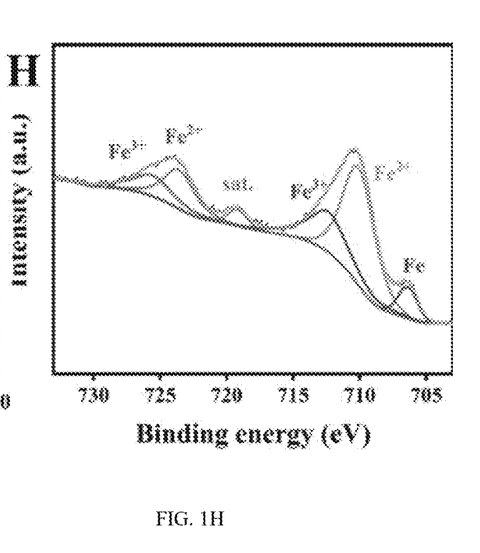
FIG. 1H depicts Fe2p XPS (X-ray Photoelectron Spectroscopy) spectra for $Fe_7S_8$, depicting the intensity of the nanosheets at varying binding energy.

Preparation of Colorimetric Nanosensors Based on $Fe_7S_8$ Nanosheets.
Synthesis of Nanosheets:

0.5425 g of $FeCl_2 \cdot 4H_2O$ and 0.2374 g of $CH_4N_2S$ were dissolved in 100 mL EG, stirred until fully dissolved, and the mixed solution transferred to a 200 mL Teflon-lined autoclave and heated at 200° C. for 12 h. After cooling to room temperature, the solid product was settled by centrifugation, and then washed with deionized water and ethanol alternately three times. After drying in a vacuum oven at 60° C. for 12 h, the final product was referred to as $Fe_7S_8$.
Characterization of Nanosheets:

As shown, observe the morphology of solid products through scanning electron microscopy, the nanosheets of $Fe_7S_8$ were covered with large number of fine particles (FIG. 1A). TEM observation revealed that the surface of the nanosheets was covered with irregular and short rods with an average length of 60.1 nm (FIG. 1 C, FIG. 1D). EDS mapping indicated that Fe and S were uniformly distributed on the surface of the nanosheets. The Fe and S weight percentages were 61.7% and 38.3%, respectively, which were consistent with the theoretical ratio in $Fe_7S_8$ (FIG. 1 B, FIG. 1E, FIG. 1F). XRD analysis of the crystal structure of $Fe_7S_8$ displayed four strong diffraction peaks at 30.022°, 33.995°, 44.028° and 53.317° corresponding to the (200), (203), (206) and (220) crystal planes, respectively. These peaks were identical to the $Fe_7S_8$ standard card PDF #24-0220. No other heterogeneous phases were observed in the $Fe_7S_8$ crystals, implying that the as-prepared nanomaterial was of high purity. (FIG. 1G) The high-resolution Fe2p spectrum of $Fe_7S_8$ showed peaks at 711.1 eV and 724.9 eV belonging to $Fe^{2+}$, while those at 713.1 eV and 727.0 eV belonged to $Fe^{3+}$ (FIG. 1H). Based on the above characterization results, it can be concluded that the nanosheets synthesized in this embodiment are $Fe_7S_8$ nanosheets.

Prepare a GSH aqueous solution with a concentration of 1 mmol/L, a NaAc-HAc buffer with a pH of 4.0, a TMB chromogenic solution with a concentration of 6 mmol/L (solvent DMSO), a $H_2O_2$ aqueous solution with a concentration of 50 mmol/L, and a $Fe_7S_8$ suspension with a $Fe_7S_8$ nanosheet content of 100 μg/mL for future use.

Example 2

$Hg^{2+}$ Detection Based on the Colorimetric Nanosensor of Example 1.
(1) Prepare standard solutions with different $Hg^{2+}$ concentrations, ranging from 0.01 μmol/L to 500 μmol/L, using gradient dilution method;
(2) Take 50 μL of standard solutions with different $Hg^{2+}$ concentrations, dilute them to 1700 μL with NaAc-HAc buffer, add 50 μL of GSH aqueous solution to the diluent, mix well, and react at room temperature for 10 min;
(3) Add 100 μL of TMB colorimetric solution, 40 μL of $H_2O_2$ with a concentration of 50 mmol/L, and 60 μL of $Fe_7S_8$ suspension to the reacted system, mix well to obtain the colorimetric system, and incubate in a 40° C. water bath for 20 min to produce blue color;
(4) Filter the color developing system after reaction (3) through a 0.22 μm mixed cellulose filter membrane to remove $Fe_7S_8$, terminate the reaction, and measure the absorbance value of the filtrate at 652 nm using a UV spectrophotometer.

Figure 2:
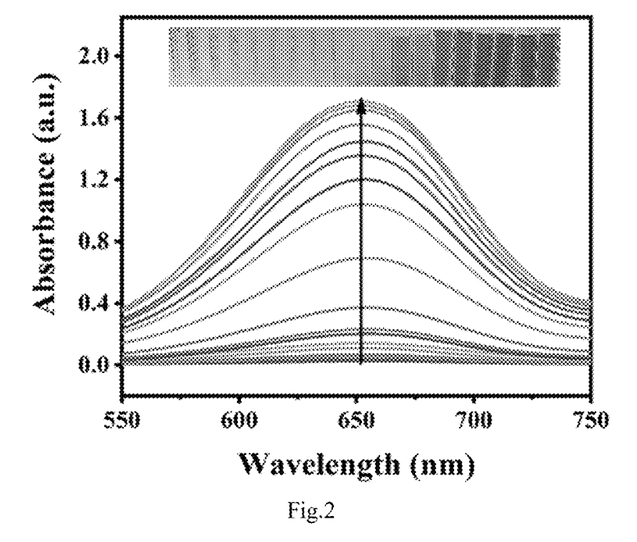
FIG. 2 shows the absorbance variation curve of the colorimetric nanosensor under different $Hg^{2+}$ concentrations in Example 2.

The test results showed that from 0.01 to 500 μmol/L, with the increase of $Hg^{2+}$ concentration, the $A_{652}$ value monotonically increased, while the blue solution gradually deepened (FIG. 2).

Figure 3:
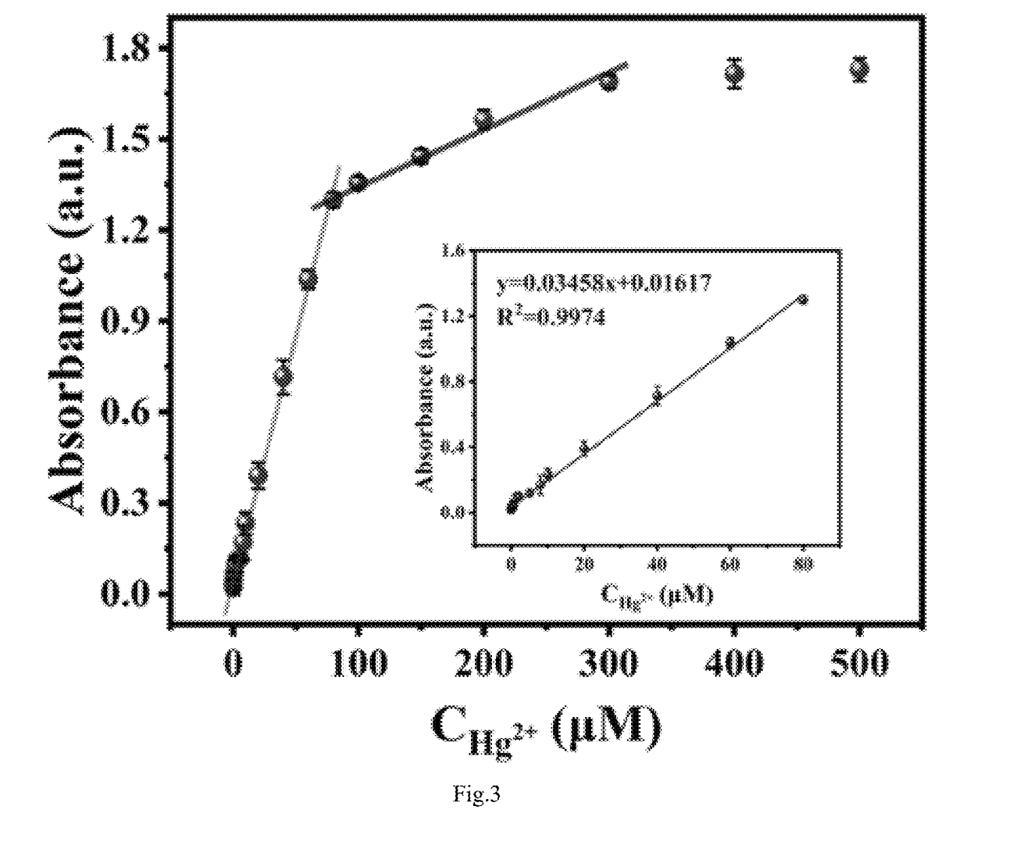
FIG. 3 shows a linear curve plot in Example 2, with $Hg^{2+}$ concentration as the x-axis and $A_{652}$ value as the y-axis.
Figure 4:
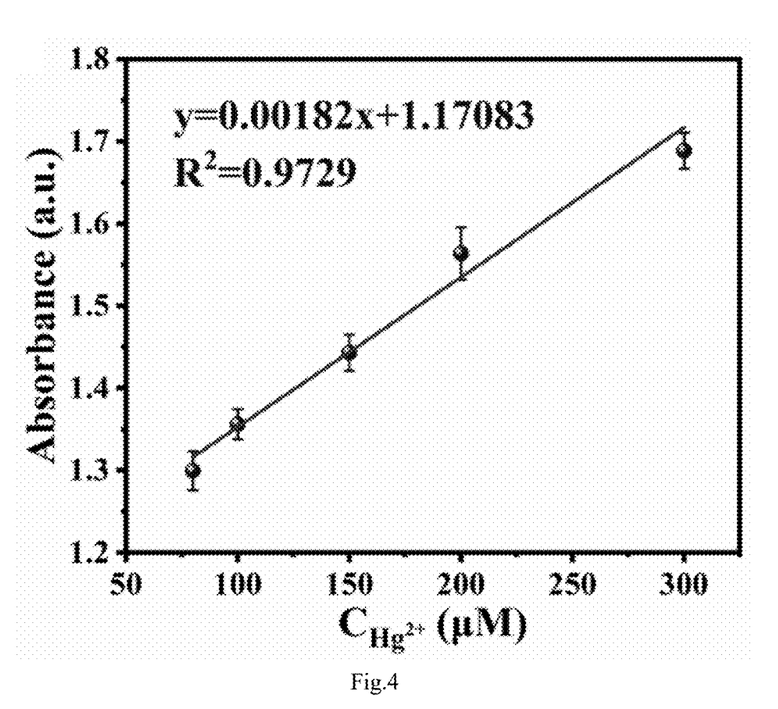
FIG. 4 shows the standard curve of $Hg^{2+}$ concentration in the range of 80-300 μmol/L as shown in FIG. 3.

Draw a linear curve with $Hg^{2+}$ concentration as the x-axis and $A_{652}$ value as the y-axis, and the results show that, There is a good linear relationship between $Hg^{2+}$ in the range of 0.01~80 μmol/L and 80~300 μmol/L, respectively. The standard curve within the range of 0.01~80 μmol/L is y=0.03458x+0.01617, with a linear determination coefficient ($R^2$) of 0.9974 (FIG. 3). The standard curve within the range of 80-300 μmol/L is y=0.00182x+1.17083, with an $R^2$ of 0.9729 (FIG. 4). Based on a 3 times signal-to-noise ratio (S/N=3), the detection limit (LOD) is calculated to be 3.0 nM.

The detection lines and linear ranges of the colorimetric nanosensor in this embodiment and the existing colorimetric nanosensor are shown in Table 1 (the data of the existing colorimetric nanosensor is from the literature).

TABLE 1

| Biosensing materials | Detection limit (nM) | Linear range (μM) | References |
|---|---|---|---|
| $Fe_7S_8$ | 3 | 0.01-300 | This work |
| Gel matrix | 40 | 0.1-100 | [1] |
| UiO-66-$NH_2$@Au | 12 | 0.03-1.4 | [2] |
| DHPC@CS | 7 | 0.01-1 | [3] |
| AuNPs | 4.3 | 0.005-1 | [4] |
| $NiSe_2$ | 5.2 | 0.01-0.7 | [5] |
| Peptide-based probe | 20.8 | 0-8 | [6] |
| AgNPs | 5.3 | 0.03-60 | [7] |
| C@$MoS_2$ | 2.7 | 0.01-100 | [8] |
| Spirooxazine derivative-based probe | 152 | 0.001-100 | [9] |
| Homogeneous iodide | 1100 | 1.7-166.7 | [10] |
| $Ag_2WO_4$ | 83 | 0.25-8 | [11] |

[1] X Li, H Wang, X Wang, G Lai, J Gong. "All-in-One" ultra-portable colorimetric sensor coupled with confinement effect for $Hg^{2+}$ highly sensitive and instant detection. *Sensor Actuat B: Chem* 351: 130945 (2022).
[2] Y Zhai, Y Li, X Huang, J Hou, H Li, S Ai. Colorimetric and ratiometric fluorescent dual-mode sensitive detection of $Hg^{2+}$ based on UiO-66-$NH_2$@Au composite. *Spectrochim Acta A* 275: 121187 (2022).
[3] S Zhang, S Wei, H Cheng, B Rong. A highly sensitive colorimetric sensor for $Hg^{2+}$ detection based on the oxidative enzyme mimics-like activity of hierarchical porous carbon@chitosan-modified silver nanoparticles. *J King Saud Univ Sci* 32(2): 1265-1271 (2020).
[4] H Khani, S Abbasi, M Tavakkoli Yaraki, Y N Tan. A naked-eye colorimetric assay for detection of $Hg^{2+}$ ions in real water samples based on gold nanoparticles-catalyzed clock reaction. *J Mol Liq* 345: 118243 (2022).
[5] L Luo, C Xi, J Zhuo, G Liu, S Yang, Y Nian, J Sun, M Q Zhu, J Wang. A portable dual-mode colorimetric platform for sensitive detection of $Hg^{2+}$ based on $NiSe_2$ with $Hg^{2+}$-Activated oxidase-like activity. *Biosens Bioelectron* 215: 114519 (2022).
[6] L Xiao, P Wei, H He, Y Gou, Y Ge, Y Liu, P Wang, Y Liao. Peptide-based fluorescent and colorimetric dual-functional probe for visual detection of $Cu^{2+}$, $Hg^{2+}$ and $S^{2-}$ in 100% aqueous media, living cells and paper test strips. *J Photoch Photobio A* 433: 114178 (2022)
[7] F Faghiri, F Ghorbani. Colorimetric and naked eye detection of trace $Hg^{2+}$ ions in the environmental water samples based on plasmonic response of sodium alginate impregnated by silver nanoparticles. *J Hazard Mater* 374: 329-340 (2019)
[8] L Feng, L Zhang, Y Gong, Z Du, X Chen, X Qi, X Zhang, G Mao, H Wang. Hollow C@$MoS_2$ nanotubes with $Hg^{2+}$-triggered oxidase-like catalysis: A colorimetric method for detection of $Hg^{2+}$ ions in wastewater *Sensor Actuat B: Chem* 361: 131725 (2022)
[9] S Pattaweepaiboon, T Nanok, N Kaewchangwat, K Suttisintong, W Sirisaksoontorn. Colorimetric detection of $Hg^{2+}$ and $CH_3Hg^+$ by a novel spirooxazine derivative as a highly sensitive and selective probe. *Dyes Pigments* 186: 108996 (2021).
[10] Y Wang, L Xu, W Xie. Rapid and sensitive colorimetric sensor for $H_2O_2$ and $Hg^{2+}$ detection based on homogeneous iodide with high peroxidase-mimicking activity. *Microchem J* 147: 75-82 (2019).
[11] P Ju, Z Wang, Y Zhang, X Zhai, F Jiang, C Sun, X Han. Enhanced oxidase-like activity of Ag@$Ag_2WO_4$ nanorods for colorimetric detection of $Hg^{2+}$. *Colloid Surface A* 603: 125203 (2020)

From this, it can be seen that the colorimetric nanosensor in Example 1 achieved a lower detection limit of $Hg^{2+}$ and a wider linear range, providing feasibility for the determination of trace/trace $Hg^{2+}$ in water samples. The sensitivity of the constructed nanosensor for $Hg^{2+}$ detection is comparable to or even better than other previous methods, and the preparation method of $Fe_7S_8$ nanosheets used is simple and cost-effective, which can greatly reduce detection costs and time while simplifying trace $Hg^{2+}$ detection operations, and has broad application prospects.

Example 3

Colorimetric Detection of Trace $Hg^{2+}$ in Environmental Water.

The water sample to be tested in this embodiment comes from real-world samples, including tap water, lake water, campus river water, and domestic wastewater.

(1) Prepare pre-treatment water samples with standard concentrations of 0.1 μmol/L, 1 μmol/L, and 10 μmol/L using $Hg^{2+}$ standard solution and the aforementioned test water samples, respectively;
(2) Take 20 mL of each pre-treatment water sample and transfer it to a 150 mL conical flask. Adjust the pH to 4.0 by dropwise adding NaOH and HCl solutions, and add 5 mg of $Fe_7S_8$ nanosheets as adsorbents. Seal the conical flask with a sealing membrane and shake it at room temperature for 20 min. With the help of an external magnet, separate and remove the supernatant, leaving $Fe_7S_8$ nanosheets enriched with $Hg^{2+}$. Mix the $Fe_7S_8$ nanosheets enriched with an appropriate amount of NaAc-HAc buffer to prepare a $Fe_7S_8$ suspension with a concentration of 100 μg/mL for later use;
(3) Take 50 μL of GSH aqueous solution with a concentration of 1 mmol/L, 100 μL of TMB colorimetric solution with a concentration of 6 mmol/L, 40 μL of $H_2O_2$ with a concentration of 50 mmol/L, and 60 μL of $Fe_7S_8$ suspension with a concentration of 100 μg/L. Use NaAc Hac buffer to make up to 2000 μL, mix evenly to obtain the colorimetric system, and incubate in a water bath at 40° C. for 20 min to react and produce blue color;
(4) Filter the color developing system after reaction (3) through a 0.22 μm mixed cellulose filter membrane to remove $Fe_7S_8$, terminate the reaction, and measure the absorbance value of the filtrate at 652 nm using a UV spectrophotometer.

The analytical accuracy and precision of the developed nanosensor were evaluated in terms of spiked recovery rate and relative standard deviation (RSD) of $Hg^{2+}$. According to Table 2, the average sample recovery rate is between 92.4% and 110.2%, with an RSD of less than 3.54%. These data indicate that $Fe_7S_8$ based nanosensors can provide satisfactory analytical indicators for the rapid and sensitive determination of $Hg^{2+}$ in environmental water.

TABLE 2

| | | UV-vis spectrometer | | |
|---|---|---|---|---|
| Sample | Added (μmol/L) | Found (μmol/L) | Recovery (%) | RSDs (%) |
| Tap water | 0.1 | 0.11 | 110.0 | 3.42 |
| | 1 | 0.983 | 98.3 | 2.84 |
| | 10 | 9.24 | 92.4 | 3.17 |
| Lake water | 0.1 | 0.108 | 108 | 2.59 |
| | 1 | 1.024 | 102.4 | 1.67 |
| | 10 | 10.36 | 103.6 | 2.56 |
| River water | 0.1 | 0.094 | 94.0 | 1.56 |
| | 1 | 1.021 | 102.1 | 1.97 |
| | 10 | 9.72 | 97.2 | 3.54 |
| Sewage | 0.1 | 0.096 | 96.0 | 2.43 |
| | 1 | 0.948 | 94.8 | 3.07 |
| | 10 | 9.73 | 97.3 | 3.19 |

Note:
Each experiment was conducted in triplicate (n = 3).

Example 4

Anti Interference Test of Colorimetric Nanosensor in Example 1.

The method in this embodiment refers to Example 2, with the only difference being that different concentrations of interfering substances are also added when preparing standard solutions with different $Hg^{2+}$ concentrations in step (1).

In this embodiment, the interfering substances include various metal ions ($Pb^{2+}$, $Cu^{2+}$, $Se^{4+}$, $As^{3+}$, $Hg^{2+}$, $Cr^{3+}$, $Ag^+$, $K^+$, $Ni^{2+}$, $Na^+$, $Ca^{2+}$, $Mg^{2+}$, $Mn^{2+}$, $Al^{3+}$, $Fe^{2+}$, $Fe^{3+}$, $Zn^{2+}$, $Co^{2+}$) and amino acids and small biomolecules (L-glutamic acid, sucrose, thiourea, uric acid, urea, L-serine, L-histidine, ascorbic acid (AA), D-galactose).

Figure 5A:
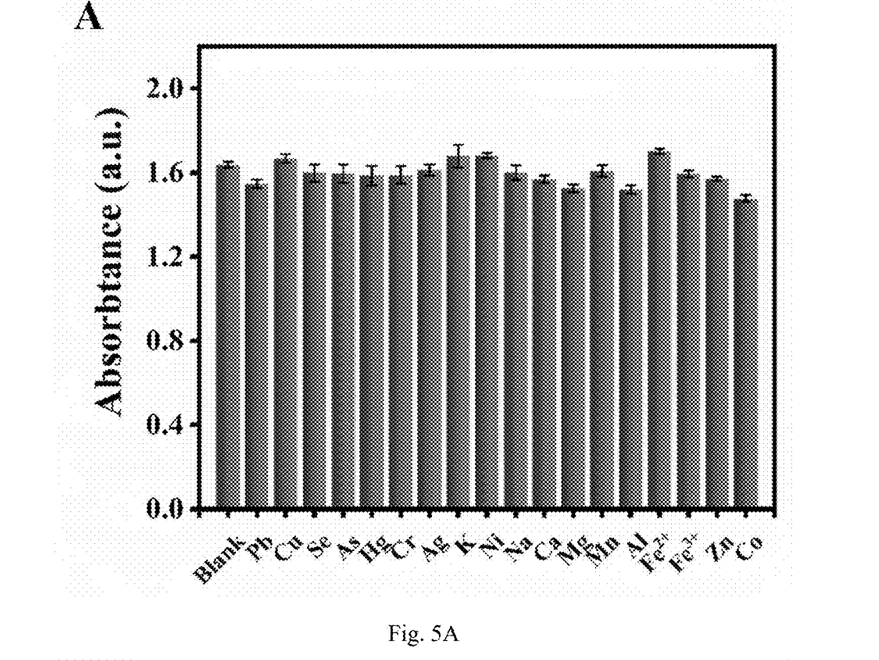
FIGS. 5A-5B shows a comparison of the interference effects of different interfering substances, including metals (FIG. 5A) and peptides and amino acids (FIG. 5B), on the color nanosensor in Example 4.
Figure 5B:
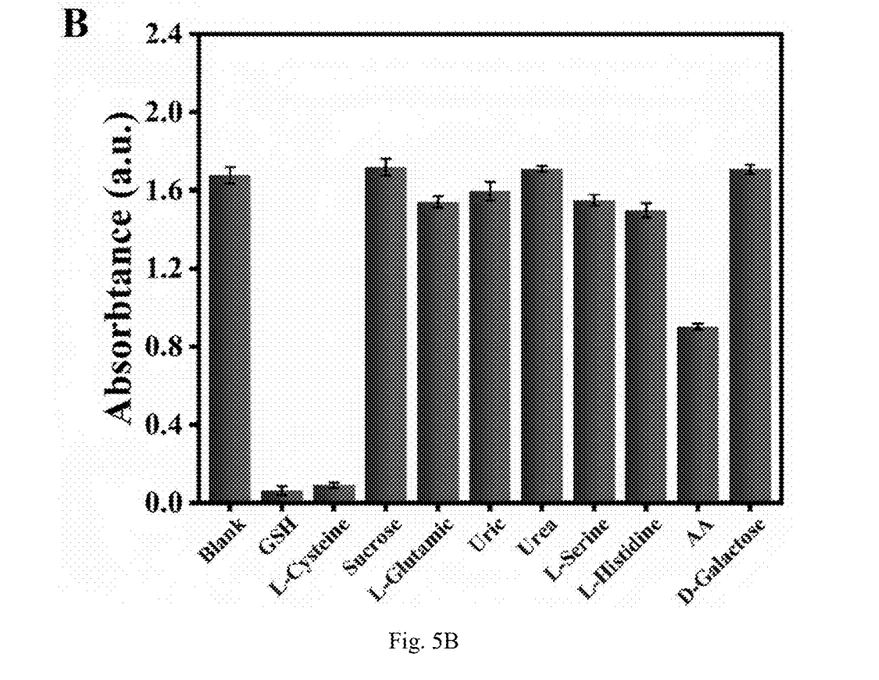

The results showed that the enhanced concentrations of $Hg^{2+}$ and GSH were both 20 μmol/L, and the enhanced concentrations of other interfering substances are 200 μmol/L, that is 10 times the peak concentration of $Hg^{2+}$ and GSH. Except for AA and L-cysteine, there was no significant change in the $A_{652}$ values of metals and other biomolecules (FIG. 5). This phenomenon indicates that most coexisting metal ions and biomolecules have a very slight impact on the color contrast reaction. Although AA, as an important antioxidant, has certain reducing ability and can inhibit the enzymatic activity of $Fe_7S_8$, the interference of L-cysteine is due to the presence of thiol groups in its molecule. However, due to the much lower levels of AA and L-cysteine in the real environment compared to GSH, their impact is also very mild.

Stability and Reusability Testing of $Fe_7S_8$ Nanosheets in Example 1.

Figure 6A:
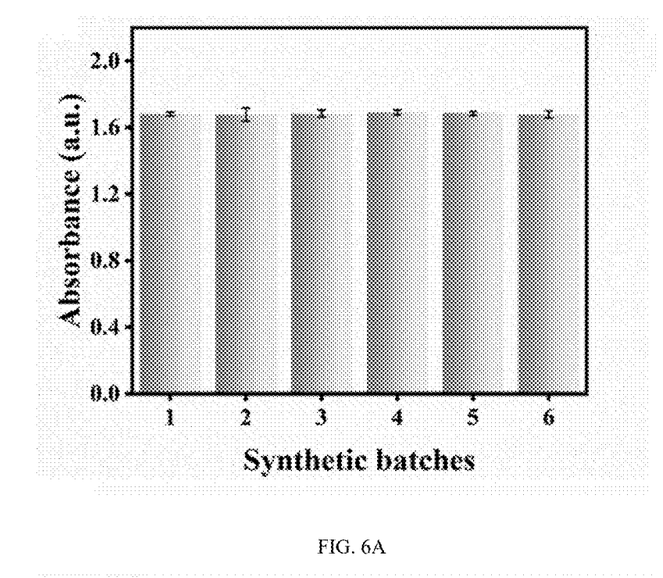
FIGS. 6A-6B shows the stability and reusability test results of $Fe_7S_8$ nanosheets in Example 4, including synthetic batches (FIG. 6A), number of cycles (FIG. 6B), and storage time (FIG. 6C)

Under identical color development conditions, $Fe_7S_8$ from six independent synthesis batches displayed no prominent differences on the absorbance intensities of the catalytic reaction systems (FIG. 6A). This demonstrates the ability to produce high homogeneity of the $Fe_7S_8$ among different synthesis batches.

Figure 6B:
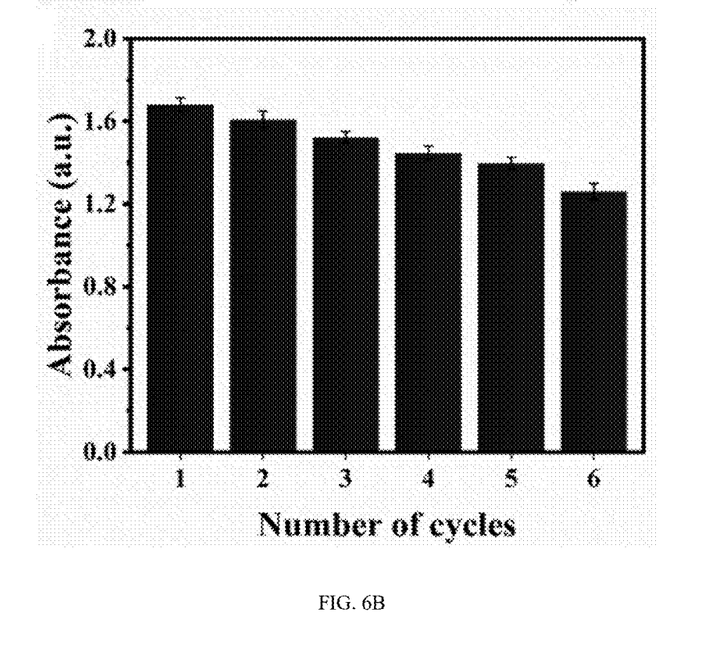

Transfer the reaction system with $Fe_7S_8$ nanosheets to a thin-walled centrifuge tube, and place a magnet below the centrifuge tube. Under the action of an external magnet, magnetic $Fe_7S_8$ nanosheets will be adsorbed at the bottom of the centrifuge tube. At this point, remove the supernatant with a dropper, leaving $Fe_7S_8$ nanosheets that can be reused after vacuum drying. As the number of cycles increases, the $A_{652}$ value monotonically decreases (FIG. 6B), but the sixth cycle only reduces the initial absorbance by 16.0%. It can be seen that sensors based on $Fe_7S_8$ nanosheets have high reusability and can be used for at least 6 cycle experiments, greatly reducing detection costs.

Figure 6C:
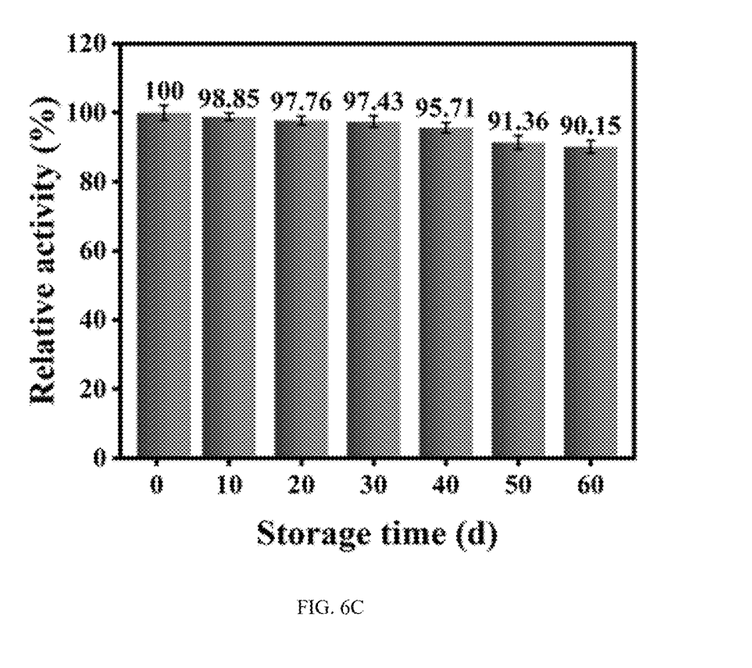

$Fe_7S_8$ nanosheets were subjected to activity tests on the day of preparation, and stored at room temperature for 10, 20, 30, 40, 50, and 60 days, respectively. The results showed that the relative activity only decreased by about 10% after 60 days of storage at room temperature (FIG. 6C), indicating its high stability.

Therefore, the colorimetric sensor of Example 1 can be used at least 6 times during a 60 day storage period, with high stability and reusability.

Example 5

Colorimetric Detection of Trace $Hg^{2+}$ in Environmental Water Based on smartphones.

Development of an Environmental Water $Hg^{2+}$ Detection and Image Acquisition Device Based on a Smartphone App.

Figure 7:
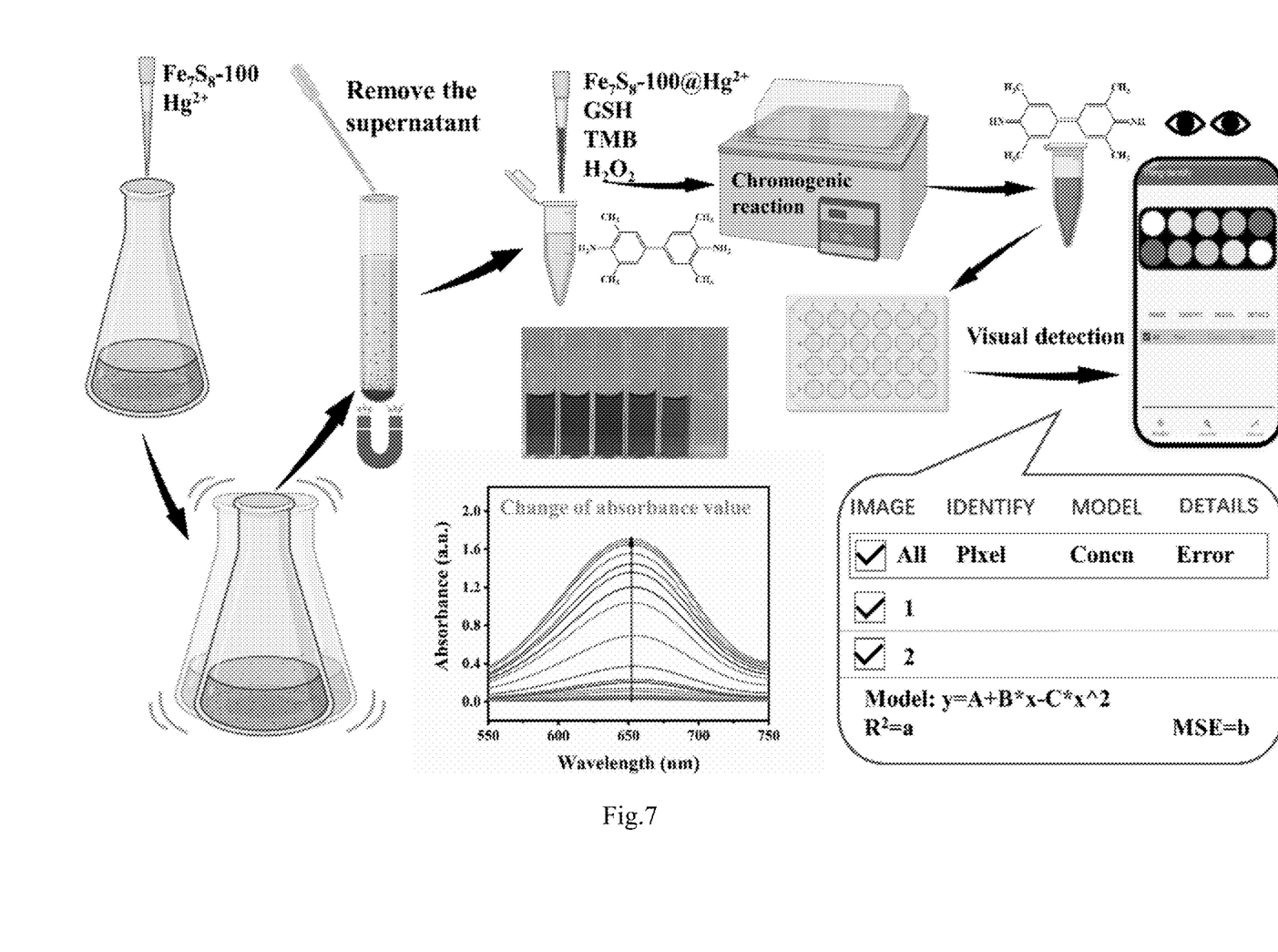
FIG. 7 is a schematic diagram of the colorimetric detection process for trace-level $Hg^{2+}$ in environmental water based on smartphones in Example 5.
Figure 8A:
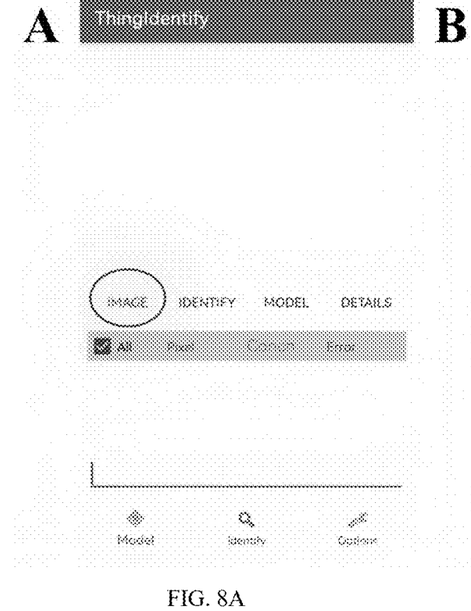
FIGS. 8A-8H is a schematic diagram of the usage process of "Thing Identity" software, demonstrating various steps of software operation using a smart phone app.
Figure 8B:
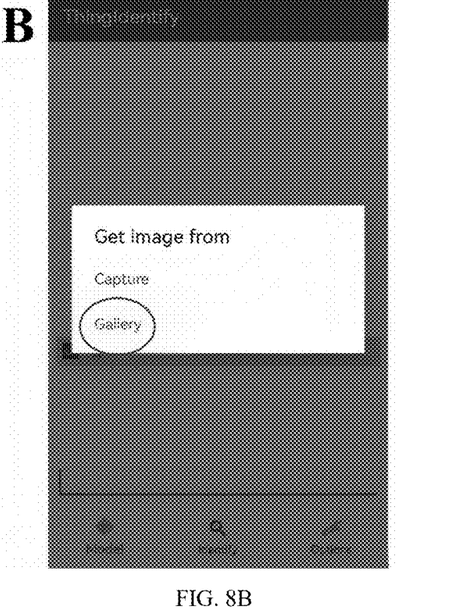
Figure 8C:
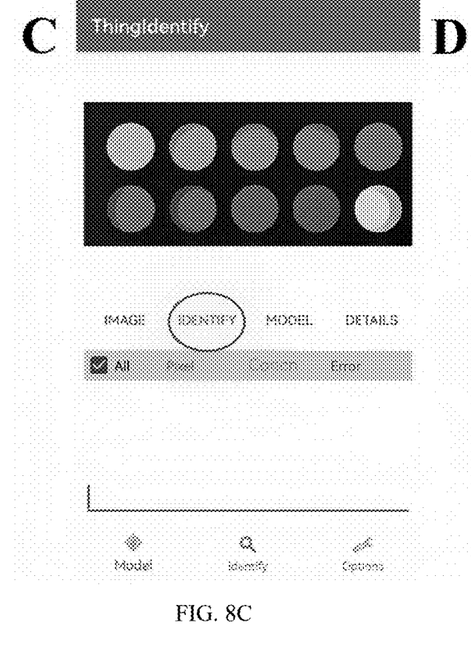
Figure 8D:
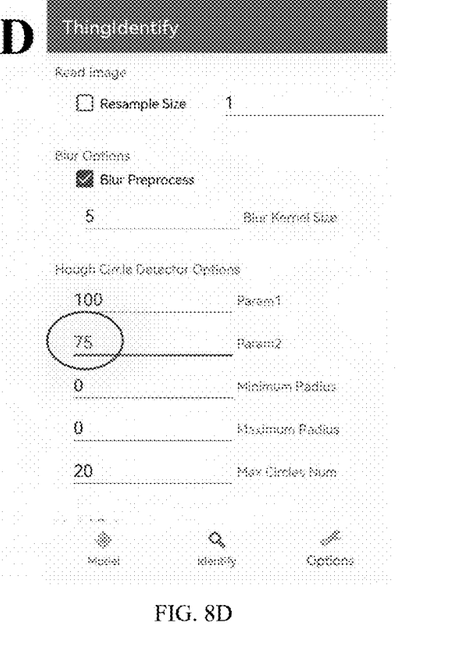
Figure 8E:
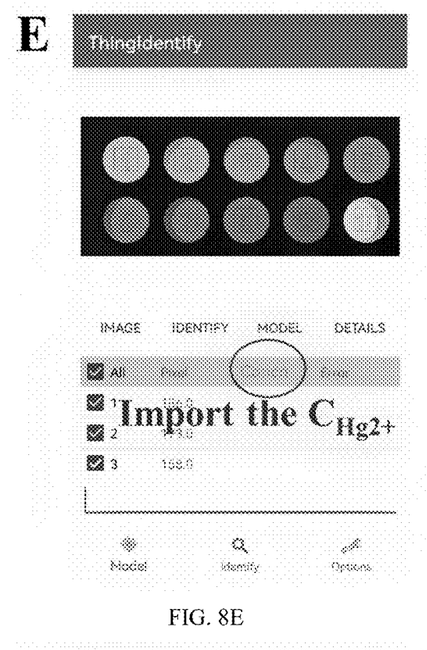
Figure 8F:
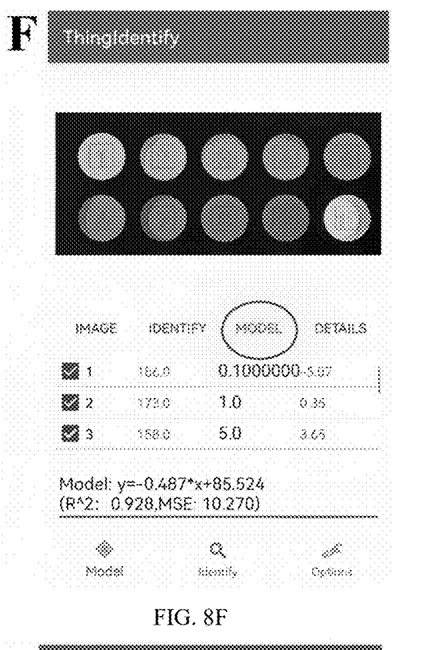
Figure 8G:
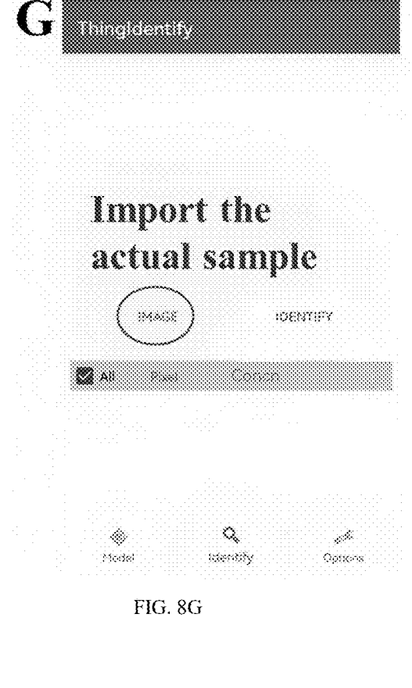
Figure 8H:
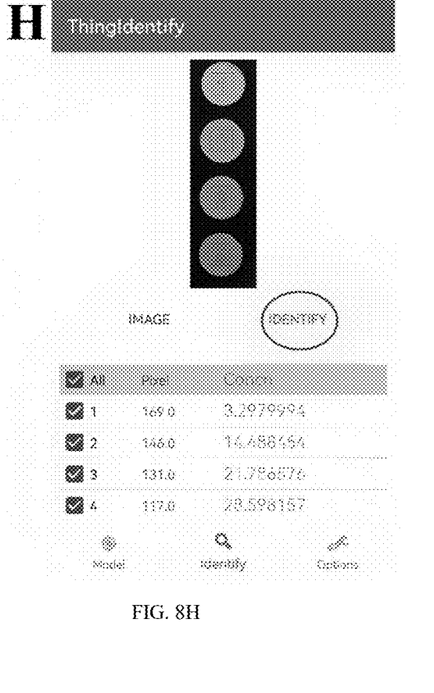

We designed a smartphone APP using high-resolution images obtained from a photography-enhancing platform. The photographic platform has the following advantages: (1) Internal sealing prevents natural light from entering the chamber and causing interferences; (2) An internal light source at the bottom enhances the blue image color; (3) Multiple samples can be tested at the same time; (4) The device is light weight and portable. Based on the optimized variables for the UV-vis absorbance tests, we developed a smartphone APP for colorimetric detection of $Hg^{2+}$, which integrated the "$Fe_7S_8$+TMB+$H_2O_2$+GSH" reaction system with "Thing Identify" software. (FIG. 7, FIG. 8)

The water sample to be tested in this embodiment comes from real-world samples, including tap water, lake water, campus river water, and domestic wastewater.

(1) Prepare pre-treatment water samples with standard concentrations of 0.1 μmol/L, 1 μmol/L, and 10 μmol/L using $Hg^{2+}$ standard solution and the aforementioned test water samples, respectively;

(2) Take 20 mL of each pre-treatment water sample and transfer it to a 150 mL conical flask. Adjust the pH to 4.0 by adding NaOH and HCl solutions dropwise. Add 5 mg of $Fe_7S_8$ nanosheets as adsorbents, seal the conical flask with a sealing membrane, and shake at room temperature for 20 min. With the help of an external magnet, separate and remove the supernatant, leaving $Fe_7S_8$ nanosheets enriched with $Hg^2$. Mix the $Fe_7S_8$ nanosheets enriched with $Hg^{2+}$ and an appropriate amount of NaAc-HAc buffer to prepare a $Fe_7S_8$ suspension with a concentration of 100 μg/mL for later use;

(3) Take 50 μL of GSH aqueous solution with a concentration of 1 mmol/L, 100 μL of TMB colorimetric solution with a concentration of 6 mmol/L, 40 μL of $H_2O_2$ with a concentration of 50 mmol/L, and 60 μL of $Fe_7S_8$ suspension with a concentration of 100 μg/L. Use NaAc-HAc buffer to make up to 2000 μL, mix evenly to obtain the colorimetric system, and incubate in a water bath at 40° C. for 20 min to react and produce blue color;

(4) Filter the color developing system after reaction (3) through a 0.22 μm mixed cellulose filter membrane to remove $Fe_7S_8$, terminate the reaction, and drop the filtrate into a 96 well plate. Add each treatment solution to each well, with three copies of each treatment. Then, place the 96 well plate in the inner chamber of the device and turn on the bottom light source. After the shooting is completed, upload it to the "Thing Identity" software, calculate the grayscale value of the blue solution, and obtain the $Hg^{2+}$ concentration.

The software operation is shown in FIG. 8 (A-H), and a corresponding calibration curve was constructed based on the correlation between grayscale values and $Hg^{2+}$ concentration. The regression equation obtained by estimating the LR of the constructed calibration curve within the range of 0.1~35 μmol/L is Y=0.487X+85.524 ($R^2$=0.928), where Y is the $Hg^{2+}$ concentration and X is the color grayscale value. The colorimetric detection based on smartphones provides a 30 nmol/L LOD on the basis of S/N=3. Table 3 shows the recovery results of $Hg^{2+}$ in real water samples.

TABLE 3

| Sample | Added(μmol/L) | Smartphone | | |
|---|---|---|---|---|
| | | Found (μmol/L) | Recovery (%) | RSDs (%) |
| Tap water | 0.1 | 0.112 | 112.3 | 4.08 |
| | 1 | 0.927 | 92.7 | 4.12 |
| | 10 | 9.44 | 94.4 | 3.49 |
| Lake water | 0.1 | 0.113 | 113.0 | 3.24 |
| | 1 | 1.078 | 107.8 | 4.22 |
| | 10 | 10.57 | 105.7 | 3.67 |
| River water | 0.1 | 0.115 | 115.0 | 3.25 |
| | 1 | 0.867 | 86.7 | 3.24 |
| | 10 | 10.29 | 102.9 | 3.73 |
| Sewage | 0.1 | 0.109 | 109.0 | 3.67 |
| | 1 | 1.027 | 102.7 | 4.07 |
| | 10 | 10.72 | 107.2 | 3.62 |

Note:
Each experiment was conducted in triplicate (n = 3).

According to Table 3, the $Hg^{2+}$ concentration measured by the smartphone app is similar to that measured by the UV visible spectrophotometer, with an average recovery rate of 92.7-115.0% and an RSD of 3.24-4.22%. Overall, smartphone based sensing methods have advantages such as strong portability, high visual detection flux, speed, easy operation, and suitability for outdoor use. It can be seen that the developed smartphone based sensor provides a satisfactory alternative solution for detecting trace $Hg^{2+}$ demand points in remote environments.

The above provides a detailed description of the present disclosure, with the aim of enabling those skilled in the art to understand its content and implement it. It does not limit the scope of protection of the present disclosure. Any equivalent changes or modifications made according to the spirit and essence of the present disclosure should be covered within the scope of protection of the present disclosure.

The invention claimed is:

1. A colorimetric nanosensor for detecting trace-levels of $Hg^{2+}$ in environmental water, the colorimetric nanosensor comprising:

3~7 μg/ml of $Fe_7S_8$ nanosheets, wherein a surface of the $Fe_7S_8$ nanosheets comprises irregular and short rods having an average length of 60.1 nm, wherein X-ray diffraction analysis of the crystal structure of Fe7S8 exhibits peaks at 30.022°, 33.995°, 44.028°, and 53.317° and wherein no other heterogenous phases are observed in the $Fe_7S_8$ crystal structure:

0.025~0.2 μmol/ml of glutathione, 0.5~0.7 μmol/ml of 3,3',5,5'-tetramethylbenzidine in DMSO, 0.8~3 μmol/ml of $H_2O_2$ aqueous solution and NaAc-HAc buffer solution having a pH of 3~5, the preparation method of the $Fe_7S_8$ nanosheets comprising:

dissolving $FeCl_2 \cdot 4H_2O$ and $CH_4N_2S$ in ethylene glycol with a mass ratio of 2~3:1, under the condition of 200° C., hydrothermal treatment for 10~15 hours, then cool to room temperature, after centrifugation, washing, and drying, solid product is obtained, which is the $Fe_7S_8$ nanosheets.

2. A method for detecting trace $Hg^{2+}$ in environmental water using a colorimetric nanosensor of claim 1, wherein, the method comprises the following steps:

(1) prepare pre-treatment water samples with different spiking concentrations by mixing a plurality of water samples to be tested and varying concentrations of an $Hg^{2+}$ standard solution;

(2) mix and shake the pre-treatment water sample in step (1) with $Fe_7S_8$ nanosheets, and then separate $Fe_7S_8$ nanosheets enriched with $Hg^{2+}$ under the action of a magnet;

(3) mix $Fe_7S_8$ nanosheets enriched with $Hg^{2+}$ with glutathione, 3,3',5,5'-tetramethylbenzidine in DMSO, $H_2O_2$ aqueous solution, and NaAc HAc buffer to obtain a colorimetric system,-incubate in a water bath at 35~45° C. for 15~30 min;

(4) remove $Fe_7S_8$ from the colorimetric system after reaction in step (3) through a 0.22 μm mixed cellulose filter membrane, terminate the reaction, visually observe the color change of the colorimetric system after reaction in step (3), or measure the absorbance value of the filtrate at 652 nm using a UV spectrophotometer, or take photos of the filtrate and calculate the grayscale value.

3. The method for detecting $Hg^{2+}$ using a colorimetric nanosensor according to claim 2, wherein, an amount of the water sample to be detected in step (1) is 15~25 mL, and the spiking concentration is from 0.1~10 μmol/L of $Hg^{2+}$;

in step (2), the amount of $Fe_7S_8$ nanosheets used is 4~8 mg;

in step (2), adjust the pH value of the mixture of the pretreated water sample and the $Fe_7S_8$ nano sheet to 3.5~4.5;

in step (2), mix and shake at room temperature, and the time of the mixed oscillation is 15~30 min;

in step (3), the $Fe_7S_8$ nanosheets enriched with $Hg^{2+}$ are mixed with the NaAc HAc buffer to prepare a $Fe_7S_8$ suspension with a concentration of 50~150 μg/mL for feeding.

\* \* \* \* \*